United States Patent [19]

Toritani et al.

[11] Patent Number: 5,169,903
[45] Date of Patent: Dec. 8, 1992

[54] METHACRYLIC RESIN CAST PLATE HAVING TRANSPARENCY AND IMPACT RESISTANCE AND PROCESS FOR PREPARATION THEREOF

[75] Inventors: Akihiro Toritani; Suehiro Tayama; Yasunori Kawachi, all of Ohtake, Japan

[73] Assignee: Mitsubishi Rayon Company Ltd., Tokyo, Japan

[21] Appl. No.: 680,782

[22] Filed: Apr. 3, 1991

Related U.S. Application Data

[63] Continuation of Ser. No. 371,276, Jun. 26, 1989, abandoned.

[51] Int. Cl.$^5$ .................. C08F 279/02; C08F 265/06
[52] U.S. Cl. ........................ 525/310; 525/83; 525/285; 525/286; 525/296; 525/301; 525/304; 525/312
[58] Field of Search .................. 525/83, 310

[56] References Cited

U.S. PATENT DOCUMENTS

| | | | |
|---|---|---|---|
| 3,968,305 | 7/1976 | Oshima | 428/412 |
| 4,877,687 | 10/1989 | Azegami | 526/304 |

FOREIGN PATENT DOCUMENTS

| | | | |
|---|---|---|---|
| 7136354 | 7/1965 | Canada | 525/310 |
| 0160285 | 11/1985 | European Pat. Off. | 525/83 |
| 3424894 | 2/1986 | Fed. Rep. of Germany | 525/310 |
| 46-31460 | 9/1971 | Japan | 525/83 |
| 47-9740 | 3/1972 | Japan | 525/310 |
| 61-00211 | 1/1986 | Japan | 525/310 |
| 61-53350 | 3/1986 | Japan | 525/83 |
| 61-1053350 | 3/1986 | Japan | 525/83 |
| 61-1268746 | 11/1986 | Japan | 525/83 |
| 62-01747 | 1/1987 | Japan | 525/83 |
| 62-2001747 | 1/1987 | Japan | 525/83 |
| 1035790 | 7/1966 | United Kingdom | 525/310 |
| 1182537 | 2/1970 | United Kingdom | 525/310 |

OTHER PUBLICATIONS

Translation of Japan 61-53350, Mar. 1986.
Translation of Japan 62-01747, Jan. 1987.

Primary Examiner—James J. Seidleck
Assistant Examiner—Vasu S. Jagannathan
Attorney, Agent, or Firm—Cushman, Darby and Cushman

[57] ABSTRACT

Disclosed is a methacrylic resin cast plate which is comprised of 100 parts by weight of [I] polymethyl methacrylate or a methyl methacrylate copolymer containing at least 90% by weight of methyl methacrylate units and, dispersed therein, a graft copolymer [IV] obtained by graft-polymerizing a hard resin component [III] containing at least 90% by weight of methyl methacrylate units onto a crosslinked rubbery copolymer [II] containing at least 45% by weight of butyl acrylate units and having an average particle diameter of 0.1 to 1 μm, the amount of the graft copolymer [IV] being 2 to 30 parts by weight as the amount of the crosslinked rubbery copolymer.

4 Claims, No Drawings

METHACRYLIC RESIN CAST PLATE HAVING TRANSPARENCY AND IMPACT RESISTANCE AND PROCESS FOR PREPARATION THEREOF

This is a continuation division of application Ser. No. 07/361,276, filed on June 26, 1989, which was abandoned upon the filing hereof.

BACKGROUND OF THE INVENTION

1. Field of the Invention

The present invention relates to a methacrylic resin cast plate having a high transparency and an excellent impact resistance, and a process for the preparation thereof.

Methacrylic resin cast plates have an excellent transparency and surface gloss and a good weatherability and mechanical properties, and are widely used as illuminators, signboards, various construction materials and the like. Nevertheless, these cast plates do not have a completely satisfactory impact strength and are regarded as being brittle. The present invention is concerned with an improvement of the impact strength of the conventional methacrylic resin cast plates.

2. Description of the Related Art

As the means for improving the impact resistance of a methacrylic resin cast plate, there has been proposed a process in which a rubber component is dissolved in methyl methacrylate or a monomer mixture composed mainly of methyl methacrylate and the cast polymerization thereof is carried out by using an appropriate initiator.

For example, there have been proposed a process in which an olefin/acrylic acid ester rubbery copolymer is dissolved in monomeric methyl methacrylate and the mixture is polymerized in a cell constructed by two glass sheets, as disclosed in Japanese Examined Patent Publication No. 52-1759, and a process in which a solution of a vinyl acetate/ethylene copolymer in monomeric methyl methacrylate is partially polymerized, the phase conversion is allowed to occur to prepare a vinyl acetate/ethylene copolymer-containing partial polymerization product and the cast polymerization thereof is carried out, as disclosed in Japanese Unexamined Patent Publication No. 60-144308.

In the process disclosed in Japanese Examined Patent Publication No. 52-1759, the compatibility between the methacrylic resin and the rubber component is poor and a satisfactory impact resistance cannot be obtained. In the process disclosed in Japanese Unexamined Patent Publication No. 60-144308, the amount of the rubber component that can be dispersed in the methacrylate resin is limited, and therefore, the obtainable impact resistance is limited and a high impact strength cannot be realized.

As the means for improving the compatibility between methyl methacrylate and a rubber component, Japanese Examined Patent Publication No. 47-16186 proposes a process in which a monomer such as methyl methacrylate is graft-polymerized onto a vinyl acetate/ethylene copolymer, the obtained graft copolymer is dissolved in monomeric methyl methacrylate, and the obtained solution is subjected to cast polymerization. According to this process, the impact resistance is improved, but the excellent transparency and surface gloss inherent to cast plates become poor.

To obtain an enhanced impact resistance, a rubber component must be dispersed in a methacrylic resin with an appropriate particle diameter. In all of the foregoing processes, since a copolymer, which is not particulate, is used as the rubber source, the particle diameter of the rubber component, which has been rendered particulate by the cast polymerization, must be controlled according to the polymerization conditions and the like. Accordingly, the polymerization conditions must be strictly controlled and the physical properties other than the impact resistance, for example, the transparency and surface gloss of the obtained plate are poor.

SUMMARY OF THE INVENTION

Under the foregoing background, the primary object of the present invention is to provide a process for preparing a methacrylic resin cast plate in which a high impact resistance can be imparted without a lowering of the good mechanical properties and appearance inherent to a cast plate and other characteristic properties, and to provide a methacrylic resin cast plate having a satisfactory impact resistance as well as a high transparency.

In accordance with the present invention, there is provided a methacrylic resin cast plate having a high transparency and an excellent impact resistance, which comprises 100 parts by weight of [I] polymethyl methacrylate or a methyl methacrylate copolymer containing at least 90% by weight of methyl methacrylate units and, dispersed therein, a graft copolymer [IV] obtained by graft-polymerizing a hard resin component [III] containing at least 90% by weight of methyl methacrylate units onto a crosslinked rubbery copolymer [II] containing at least 45% by weight of butyl acrylate units and having an average particle diameter of 0.1 to 1 µm, the amount of the graft copolymer [IV] being 2 to 30 parts by weight as the amount of the crosslinked rubbery copolymer.

Furthermore, according to the present invention, there is provided a process for the preparation of a methacrylic resin cast plate having a high transparency and an excellent impact resistance, which comprises dispersing a graft copolymer [IV] obtained by graft-polymerizing a hard resin component [III] containing at least 90% by weight of methyl methacrylate onto a rubber copolymer [II] having an average particle diameter of 0.1 to 1 µm and a crosslinked structure and containing at least 45% by weight of butyl acrylate, into 100 parts by weight of [I] methyl methacrylate, a monomer mixture comprising at least 90% by weight of methyl methacrylate and up to 10% by weight of at least one monomer copolymerizable therewith, a partial polymerization product thereof, or a mixture thereof, the amount of the graft copolymer [IV] being 2 to 30 parts by weight as the amount of the rubbery copolymer [II]; and then polymerizing the thus-obtained mixture [V] in a casting mold.

DESCRIPTION OF THE PREFERRED EMBODIMENTS

The most characteristic feature of the present invention is that a rubbery copolymer having a crosslinked structure is used as the rubber source to be dispersed in monomeric methyl methacrylate, a monomer mixture composed mainly of methyl methacrylate, a partial polymerization product thereof, or a mixture thereof.

In the conventional processes (as disclosed, for example, in Japanese Examined Patent Publication No. 52-1759, Japanese Examined Patent Publication No. 60-144308) the rubber source is limited to those soluble in monomeric methyl methacrylate, but in the present invention, a rubbery copolymer which is insoluble in monomeric methyl methacrylate and has a crosslinked structure is used as the rubber source, and by graft-polymerizing a hard resin component such as methyl methacrylate onto this rubbery copolymer, the resulting graft polymer can be easily be dispersed in the particulate form in monomeric methyl methacrylate or a partial polymerization product thereof. As a result, a rubber having a low glass transition temperature (Tg), represented by a butyl acrylate/butadiene copolymer, can be used as the rubber source, and consequently, a methacrylic resin cast plate having a high impact strength can be obtained.

Other characteristics and advantages of the present invention are as follows.

(a) According to the conventional technique, a process is adopted in which the rubber component dissolved in monomeric methyl methacrylate is rendered particulate with the advance of the polymerization by controlling the polymerization conditions so that a phase separation occurs, and therefore, it is not easy to perform the control so that an appropriate particle diameter is realized. In contrast, according to the present invention, since the rubber particles are crosslinked, the shape of the rubber particles is retained over the polymerization, and thus, the particle size of the rubber component in the cast plate can be easily controlled.

(b) According to the conventional process, it is difficult to control the particle diameter of rubber particle below 1 $\mu$m and the rubber is not crosslinked, and therefore, when the cast plate is drawn, the transparency becomes poor. In contrast, in the present invention, since a crosslinked rubber having a particle diameter of 0.1 to 1 $\mu$m is used, the transparency is the same in the obtained cast plate even after drawing.

If the composition of the rubber phase is selected so that the difference of the refractive index between the methyl methacrylate resin phase and the rubber phase is smaller than a certain value, an especially excellent transparency can be obtained.

(c) In the present invention, since a crosslinked rubbery copolymer composed mainly of butyl acrylate, which has a good weatherability, is used, a high impact resistance can be obtained while retaining the inherent excellent weatherability of the methyl methacrylate resin.

(d) Since polymerization is carried out in the presence of a dispersed rubbery copolymer obtained by graft-polymerizing a hard resin component such as methyl methacrylate, the obtained cast plate shows a high impact strength because of a good adhesion or compatibility between the rubber phase and the methacrylic resin phase.

This methacrylic resin cast plate having an excellent impact resistance can be valuably used in fields where a high transparency and an excellent impact resistance are required, for example, as signboards, illuminators, windows, and sanitary products.

In the present invention, methyl methacrylate, a mixture comprising at least 90% by weight of methyl methacrylate and up to 10% by weight of at least one monomer copolymerizable therewith, a partial polymerization product thereof, or a mixture thereof is used. A preferred monomer mixture comprises at least 90% by weight of methyl methacrylate and up to 10% by weight of at least one monomer copolymerizable therewith. By the term "partial polymerization product" is meant a polymerization product of methyl methacrylate or a mixture of methyl methacrylate and a copolymerizable monomer, in which the conversion is not higher than 35%. If a partial polymerization product of methyl methacrylate having a conversion higher than 35% is used, it is difficult to uniformly disperse the graft copolymer, the viscosity of the mixture of the obtained partial polymer and the graft copolymer [IV] is greatly increased, and the handling of the mixture for the cast polymerization becomes difficult. The partial polymerization product can be used in the form of a mixture thereof with methyl methacrylate or a monomer mixture composed mainly of methyl methacrylate. The process for preparing the partial polymerization product of methyl methacrylate is not particularly limited. For example, there can be adopted a process in which 0.01 to 1% by weight of a radical polymerization initiator is added to monomeric methyl methacrylate or a monomer mixture composed mainly of methyl methacrylate and the mixture is heated at 50° to 120° C., preferably 70° to 120° C., for a predetermined time.

As the copolymerizable monomer to be used in combination with monomeric methyl methacrylate, there can be mentioned methacrylic acid esters such as ethyl methacrylate, isopropyl methacrylate, butyl methacrylate, 2-ethylhexyl methacrylate, phenyl methacrylate and benzyl methacrylate, acrylic acid esters such as methyl acrylate, ethyl acrylate, butyl acrylate and 2-ethylhexyl acrylate, unsaturated carboxylic acids such as acrylic acid, methacrylic acid, maleic acid and itaconic acid, acid anhydrides such as maleic anhydride and itaconic anhydride, maleimide derivatives such as N-phenylmaleimide, N-cyclohexylmaleimide and N-t-butylmaleimide, hydroxyl group-containing monomers such as 2-hydroxyethyl acrylate, 2-hydroxypropyl acrylate, 2-hydroxyethyl methacrylate and 2-hydroxypropyl methacrylate, nitrogen-containing monomers such as acrylamide, methacrylamide, acrylonitrile, methacrylonitrile, diacetone acrylamide and dimethylaminoethyl methacrylate, epoxy group-containing monomers such as allyl glycidyl ether, glycidyl acrylate and glycidyl methacrylate, styrene type monomers such as styrene and 60-methylstyrene, and crosslinking agents such as ethylene glycol diacrylate, allyl acrylate, ethylene glycol dimethacrylate, allyl methacrylate, divinylbenzene and trimethylolpropane triacrylate.

The kind and amount of the copolymerizable monomer used can be appropriately selected according to the intended properties of the cast plate. To obtain a methacrylic resin cast plate having an especially excellent transparency, preferably phenyl methacrylate, benzyl methacrylate, isopropyl methacrylate or the like is used in an amount of up to 10% by weight as the copolymerizable monomer, to correct a delicate difference of the refractive index between the methacrylic resin phase and the rubber phase.

In the present invention, the rubbery copolymer [II] used must contain at least 45% by weight of butyl acrylate units. It has been found that an acrylic acid ester is preferred as the rubber component, to impart a satisfactory weatherability to the cast plate of the present invention. Among acrylic acid esters, butyl acrylate is especially excellent for obtaining an impact resin. As the other acrylic acid ester, there can be mentioned 2-ethylhexyl acrylate and the like, but it has been confirmed that these other acrylic acid esters result in products having a poor impact resistance.

The crosslinked butyl acrylate rubbery copolymer is roughly divided into [II-a]a butyl acrylate/butadiene copolymer and [II-b]a crosslinked butyl acrylate/styrene copolymer.

The butyl acrylate/butadiene copolymer [II-a] comprises at least 45% by weight of butyl acrylate and up to 55% by weight of 1,3-butadiene. It has been confirmed that when this butyl acrylate/butadiene copolymer [II-a] is used, an especially high impact resistance can be obtained in the finally cast plate.

To prepare a cast plate having a high transparency as well as an excellent impact resistance, preferably a butyl acrylate/butadiene copolymer [II-a]comprising 40 to 55% by weight of butadiene and 60 to 45% by weight of butyl acrylate is used. If the composition of the copolymer [II-a] is within this range, the difference of the refractive index between the methacrylic resin phase and the rubber phase in the obtained cast plate is smaller than 0.005 and the transparency is very high.

By the term "crosslinked butyl acrylate/styrene copolymer [II-b]" is meant a copolymer comprising at least 45% by weight of butyl acrylate, styrene or a mixture of styrene and its derivative, and a polyfunctional monomer copolymerizable with said monomers. It has been confirmed that when this copolymer [II-b] is used, the finally obtained impact-resistant cast plate has a superior weatherability.

As the polyfunctional monomer, there can be mentioned ethylene glycol dimethacrylate, ethylene glycol diacrylate, 1,3-butylene dimethacrylate, tetraethylene glycol diacrylate, divinylbenzene, trimethylolpropane triacrylate, pentaerythritol tetra-acrylate, allyl acrylate and allyl methacrylate.

A crosslinked rubbery copolymer comprising 69.9 to 89.9 by weight of butyl acrylate, 10 to 30% by weight of styrene or a mixture of styrene and a derivative thereof and 0.1 to 10% by weight of a polyfunctional monomer copolymerizable with said monomers is especially preferred as the crosslinked butyl acrylate/styrene copolymer [II-b].

In the cast plate prepared by using this preferred copolymer, the difference of the refractive index between the methacrylic resin phase and the rubber phase is smaller than 0.005, and the transparency is very high.

As another preferred crosslinked rubbery copolymer [II] for preparing a cost plate having a high transparency as well as an excellent impact strength, there can be mentioned a copolymer obtained by polymerizing 90 to 10 parts by weight of a monomer mixture comprising 69.9% to 89.9% by weight of butyl acrylate, 10 to 30% by weight of styrene or a mixture of styrene and a derivative thereof, and 0.1 to 10% by weight of a polyfunctional monomer copolymerizable with said monomers in the presence of 10 to 90 parts by weight of a rubber latex comprising 40 to 55% by weight of butadiene and 60 to 45% by weight of butyl acrylate.

If the composition of the monomer mixture of the second stage is outside the above-mentioned range, the difference of the refractive index in the copolymer formed from the rubber latex and the monomer mixture exceeds 0.005, and thus, the transparency becomes poor.

As the copolymerizable polyfunctional monomer used in this embodiment, there can be mentioned a mixture of at least one member selected from allyl acrylate, allyl methacrylate and allyl cinnamate and at least one member selected from ethylene glycol dimethacrylate, ethylene glycol diacrylate, 1,3-butylene dimethacrylate, tetraethylene glycol diacrylate, divinylbenzene, trimethylolpropane triacrylate and pentaerythritol tetra-acrylate.

The average particle diameter of the rubbery copolymer [II] used in the present invention must be 0.1 to 1 $\mu$m, preferably 0.2 to 0.8 $\mu$m.

Where a rubber copolymer having an average particle diameter smaller than 0.1 $\mu$m is used, the obtained cast plate has no impact resistance, or even if an impact resistance is obtained, it is very low. Where a rubbery copolymer having an average particle diameter exceeding 1 $\mu$m is used, when the obtained cast plate is drawn, the surface gloss almost disappears.

The rubbery copolymer [II] used in the present invention is preferably prepared by a known emulsion polymerization process. Where it is difficult to directly prepare a rubbery copolymer having an average particle diameter of at least 0.1 $\mu$m by the known emulsion polymerization process, a process can be adopted in which a rubbery copolymer latex having an average particle diameter smaller than 0.1 $\mu$m is first prepared by the known emulsion polymerization process, and the obtained rubbery copolymer latex is subjected to an agglomerating treatment so that the average particle diameter reaches 0.1 to 1 $\mu$m, preferably 0.2 to 0.8 $\mu$m. It has been confirmed that in the methacrylic resin cast plate prepared by the process of the present invention using the rubbery copolymer [II] having the particle diameter increased to 0.1 to 1 $\mu$m, preferably 0.2 to 0.8 $\mu$m, a high impact strength is obtained by this agglomerating process even at a low rubber content. Thus, it has been found that the agglomerating process is very effective for imparting an impact resistance to the final composition.

The agglomerating process is not particularly limited. For example, there can be mentioned a process in which a specific amount of an acid group-containing copolymer latex comprising a specific amount of specific polymerizable unsaturated acid units and a specific amount of specific alkyl acrylate units as the main constituent units and/or a specific amount of a oxyacid salt having a specific structure is added to the rubbery copolymer latex to agglomerate the particles, and a preferred process of this type is disclosed in Japanese Unexamined Patent Publication No. 60-229911 previously proposed by the present applicant. According to this process, a specific amount of an acid group-containing copolymer latex comprising, as main constituent units, units of a polymerizable unsaturated acid selected from acrylic acid, methacrylic acid, itaconic acid, crotonic acid , maleic acid, fumaric acid, cinnamic acid, sorbic acid and p-styrenesulfonic acid and units of an alkyl acrylate having 1 to 12 carbon atoms in the alkyl group, and/or an oxyacid salt having a specific structure is added to a rubbery copolymer latex to effect an agglomeration of the particles. As the oxyacid salt, there can be mentioned alkali metal, alkaline earth metal, zinc, nickel and aluminum salts of an oxyacid having as the center an element selected from elements belonging to the second and third periods of the groups IIIA through IVA of the Periodic Table. The agglomerating treatment is especially effective in the butyl acrylate/butadiene copolymer [II-a].

The crosslinked butyl acrylate/styrene copolymer [II-b]: is preferably prepared by the soap-free emulsion polymerization process, i.e., emulsion polymerization process not using an emulsifier. In the soap-free emulsion polymerization process, the emulsion polymerization is carried out without adding an emulsifier (surface active agent), and a latex is prepared in the same manner as in the known emulsion polymerization except that a persulfate is used as the initiator and the polymerization is carried out in the absence of an emulsifier. In this soap-free emulsion polymerization process, a rubbery copolymer latex having an average particle diameter of 0.2 to 0.8 μm can be easily obtained.

In the usual emulsion polymerization process, it is very difficult to obtain a rubber latex having a large rubber particle diameter. If the agglomerating process is adopted, the particle diameter is easily increased and an improved impact resistance is obtained. It has been found, however, that the impact resistance-manifesting effect is highest if the rubbery copolymer latex is prepared by the soap-free emulsion polymerization process.

The rubber copolymer [II] used in the present invention must have a crosslinked structure.

The graft copolymer [IV] used in the present invention is obtained by graft-polymerizing 10 to 1,000 parts by weight, preferably 10 to 400 parts by weight, of a monomer of the hard resin component comprising at least 90% by weight of methyl methacrylate units in one stage or at least two stages in the presence of a latex of the rubbery copolymer [II]. If the amount of the monomer of the hard resin component is smaller than 10 parts by weight, the dispersibility is poor. If the amount of the monomer of the hard resin component is too large, the rubber content in the graft copolymer is reduced, and therefore, the amount of the graft copolymer added to the methyl methacrylate resin must be increased, resulting in an increase of the viscosity and a reduction of the operational adaptability.

Methyl methacrylate and a monomer mixture comprising at least 90% by weight of methyl methacrylate and up to 10% by weight of a copolymerizable monomer are preferably used as the monomer for the hard resin component. As the copolymerizable monomer, there can be mentioned methyl acrylate, ethyl acrylate, styrene, phenyl methacrylate, benzyl methacrylate, isopropyl methacrylate and acrylonitrile. To obtain a cast plate having not only an excellent impact resistance but also a high transparency, preferably the difference of the refractive index between the polymer (graft polymer) of the hard resin component and the methyl methacrylate resin is not larger than 0.005, especially not larger than 0.002.

In the present invention, the amount of the graft copolymer [IV] to be dispersed in monomeric methyl methacrylate, a monomer mixture composed mainly of methyl methacrylate, or a partial polymerization product mixture thereof must be such that the amount of the rubbery copolymer [II] in the graft copolymer [IV] is 2 to 30 parts by weight per 100 parts by weight of monomeric methyl methacrylate, a monomer mixture composed mainly of methyl methacrylate or a partial polymerization product mixture thereof. If the amount of the rubbery copolymer [II] is smaller than 2 parts by weight, the cast plate has no impact resistance as the final composition, or if obtained, the impact resistance is very low. If the amount of the rubbery copolymer [II] is larger than 30 parts by weight, the viscosity of the mixture obtained by the dispersion is very high, and thus the handling is very difficult at the cast polymerization.

To improve the weatherability in the methacrylic resin cast plate of the present invention, preferably a benzotriazole type ultraviolet absorber and a hindered amine compound are incorporated in the methyl methacrylate resin in amounts of 0.1 to 10% by weight and 0.05 to 1.0% by weight, respectively, based on said resin.

As the benzotriazole type ultraviolet absorber, there can be mentioned 2-(5-methyl-2-hydroxyphenyl)benzotriazole, 2-(3,5-di-t-butyl-2-hydroxyphenyl)benzotriazole, 2-(hydroxy-5-t-butylphenyl)benzotriazole and 2,2-methylene-bis[4-(1,1,3,3-tetramethylbutyl)-6-(2H-benzotriazol-2-yl)phenol].

As the hindered amine compound, there can be mentioned bis(2,2,6,6-tetramethyl-4-piperidyl) sebacate, tetrakis(2,2,6,6-tetramethyl-4-piperidyl) 1,2,3,4-butanetetracarboxylate and a dimethyl succinate/1-(2-hydroxyethyl)-4-hydroxy-2,2,6,6-tetramethylpiperidine polycondensate.

The methacrylic resin cast plate having an excellent impact resistance according to the present invention is preferably prepared by a customary cast polymerization process. More specifically, a radical polymerization initiator is incorporated in the mixture [V] obtained by dispersing the graft copolymer [IV] in monomeric methyl methacrylate, a partial polymerization product mixture thereof, a monomer mixture composed mainly of methyl methacrylate or a partial polymerization product mixture thereof, and the obtained starting casting material is castpolymerized. As specific examples of the cast polymerization process, there can be adopted a cell casting process in which the casting material is poured between two confronting inorganic glass sheets or metal sheets having the periphery sealed by gaskets and is heated in this state, and a continuous casting process in which the casting material is continuously poured downward in a space defined by two confronting stainless steel endless belts having one surface mirror-polished and travelling in the same direction at the same speed, and having gaskets, and is heated in this state.

Preferably a radical polymerization initiator such as an azo compound or an organic peroxide is used for polymerizing the above-mentioned polymerizable casting material.

As specific examples of the azo compound, there can be mentioned 2,2-azobisisobutyronitrile, 2,2'-azobis(2,4-dimethylvaleronitrile) and 2,2,-azobis(2'4-dimethyl-4-methoxyvaleronitrile). As specific examples of the organic peroxide, there can be mentioned benzoyl peroxide and lauroyl peroxide. A redox type polymerization initiator, for example, a combination of an organic peroxide and an amine also can be used.

The polymerization temperature adopted for the production of the methacrylic resin cast plate is changed according to the kind of the radical polymerization initiator used, but in general, the polymerization temperature is 10° to 150° C.

The thickness of the cast plate obtained by the cast polymerization is not particularly limited, but a thickness of a commercially available product, i.e., a thickness of 0.2 to 65 mm, is preferred.

Additives such as a colorant, an ultraviolet absorber, a heat stabilizer, an antistatic agent, a filler and the like can be added at an appropriate step in the process of the present invention.

The present invention will now be described in detail with reference to the following examples that by no means limit the scope of the invention. Note, all of "parts" in the examples are by weight.

In the examples and comparative examples, the physical properties were determined by the following methods.

| | |
|---|---|
| Izod impact strength: | ASTM D-256 (23° C., notched) |
| Dynstat impact strength: | BS-1330 (23° C.) |
| Total luminous transmittance: | ASTM D-1003 (23° C.) |
| Haze value: | ASTM D-1003 (23° C.) |

EXAMPLE 1

| | |
|---|---|
| n-Butyl acrylate | 5.5 kg |
| 1,3-Butadiene | 4.5 kg |
| Diisopropylbenzene hydroperoxide | 20 g |
| Potassium beef-tallow fatty acid | 100 g |
| Sodium N-lauroylsarcosine | 50 g |
| Sodium pyrophosphate | 50 g |
| Ferrous sulfate | 0.5 g |
| Dextrose | 30 g |
| Deionized water | 20 kg |

Oxygen contained in the above components exclusive of 1,3-butadiene was replaced by nitrogen so that the polymerization reaction was not substantially inhibited. Then, all the components were charged in a 40-liter autoclave and the polymerization was carried out at 50° C. The polymerization was completed in 9 hours, and a rubber latex having a particle diameter of 0.07 μm was obtained at a conversion of 97%.

(2) Synthesis of agglomerating Acid Group-Containing Copolymer Latex

| First Stage | |
|---|---|
| n-Butyl acrylate | 250 g |
| Potassium oleate | 20 g |
| Sodium dioctylsulfosuccinate | 10 g |
| Cumene hydroperoxide | 1.0 g |
| Sodium formaldehyde-sulfoxylate | 3 g |
| Deionized water | 2000 g |

The mixture of the above components was polymerized at 70° C. for 1.5 hours in a 5-liter roundbottom glass flask.

| Second Stage | |
|---|---|
| n-Butyl acrylate | 600 g |
| Methacrylic acid | 150 g |
| Cumene hydroperoxide | 3 g |

Thereafter, the mixture of the above-mentioned components was dropped into the above polymerization mixture, over a period of 1 hours, and the reaction mixture was stirred for 1 hour to obtain a copolymer latex at a conversion of 98%.

(3) Preparation of Agglomerated Rubbery Copolymer [II]

The above-mentioned rubbery copolymer latex containing 10 kg of the polymer solid was stirred in a 60-liter autoclave, 1.5 kg of a 10% aqueous solution of sodium sulfate was added at an inner temperature of 50° C., and the mixture was maintained at that temperature for 15 minutes. Then, 152 g of the above-mentioned agglomerating acid group-containing copolymer latex was added and the mixture was maintained at the above temperature for 30 minutes. The average particle diameter of the obtained agglomerated rubbery copolymer [II] was 0.148 μm.

(4) Preparation of Latex of Graft Copolymer [IV]

Into the reaction vessel used for the agglomerating reaction and filled with the latex of the agglomerated rubber copolymer containing 10 kg of the polymer solid, were charged 9 kg of deionized water, 20 g of sodium formaldehyde-sulfoxylate and 50 g of sodium N-lauroylsarcosine, the inner temperature was elevated to 75° C., and the following starting materials were continuously added and polymerized.

| | |
|---|---|
| Methyl methacrylate | 4,320 g |
| Ethyl acrylate | 180 g |
| n-Octylmercaptan | 6.75 g |
| Cumene hydroperoxide | 16 g |

After completion of the addition, the polymerization was conducted for 60 minutes. The conversion of methyl methacrylate was substantially 100%.

To the obtained polymer latex were added 58 g of styrenated phenol, 44 g of dilauryl thiodipropionate and 58 g of triphenyl phosphite, and the latex was coagulated at a temperature of 50° C. with 0.25% aqueous sulfuric acid at a latex/water ratio of ½ and maintained at 85° C. for 5 minutes.

The obtained polymer slurry was washed, dehydrated and dried at 65° C. for 36 hours to obtain a white powder (graft copolymer [IV]).

(5) Preparation of Casting Material (Mixture [V])

To 100 parts of a partial polymerization product of methyl methacrylate having a viscosity of 100 centipoise (conversion =10%) was added 10 parts of the graft copolymer [IV](white powder), and the graft copolymer was uniformly dispersed by stirring for about 1 hour using a homomixer. Then, 0.2 part of 2-(5-methyl-2-hydroxyphenyl)benzotriazole and 0.3 part of bis(2,2,6,6-tetramethyl-4-piperidyl) sebacate were added as the stabilizer, and 0.06 part of azobis(2,4-dimethylvaleronitrile) was dissolved as the polymerization initiator to obtain a starting casting material (mixture [V]).

(6) Preparation of Cast Plate

Dissolved air was removed from the starting casting material (mixture [V]) under a reduced pressure. The starting of gaskets and two reinforced glass sheets, so that the thickness of the formed plate was 3 mm. The polymerization was carried out for 60 minutes in a warm water atmosphere maintained at 82° C. and for 30 minutes in an air atmosphere maintained at 130° C.

The obtained methacrylic resin cast plate having a thickness of 3 mm had an Izod impact strength (notched) of 5.0 kg.cm/cm$^2$, a Dynstat impact strength of 18.5 kg.cm/cm$^2$, a total luminous transmittance of 92.5%, and a haze of 1.4% (see Table 1).

COMPARATIVE EXAMPLE 1

Preparation of Cast Plate Composed Solely of Methyl Methacrylate Resin

A casting material was prepared by dissolving 0.06 part by weight of azobis(2,4-dimethylvaleronitrile) as the polymerization initiator into a partial polymerization product of methyl methacrylate having a viscosity =100 centipoise (Conversion =10%), and this casting material was cast-polymerized in the same manner as described in (6) of Example 1 to obtain a methacrylic resin cast plate. The results of the evaluation of the physical properties of the obtained cast plate are shown in Table 1.

EXAMPLE 2

A methacrylic resin cast plate was prepared in the same manner as described in Example 1 except that the amount of the graft copolymer [IV](white powder) added was changed to 15 parts. The results of the evaluation of the physical properties of the obtained cast plate are shown in Table 1.

EXAMPLE 3

A methacrylic resin cast plate was prepared in the same manner as described in Example 1 except that the partial polymerization product of methyl methacrylate was changed to one having a viscosity of 1,000 centipoise (conversion = 20%) and the amount of the graft copolymer [IV] (white powder) added was changed to 5 parts. The results of the evaluation of the physical properties of the obtained cast plate are shown in Table 1.

EXAMPLE 4

A methacrylic resin cast plate was prepared in the same manner as described in Example 1 except that the partial polymerization product of methyl methacrylate was changed to monomeric methyl methacrylate and the amount of the graft copolymer [IV] (white powder), added was changed to 20 parts. The results of the evaluation of the physical properties of the obtained cast plate are shown in Table 1.

EXAMPLE 5

A methacrylic resin cast plate was prepared in the same manner as described in Example 1 except that a rubber latex having a particle diameter of 0.07 μm was prepared at a conversion of 97% from a composition comprising the components described below.

| Butyl acrylate | 5.0 kg |
|---|---|
| 1,3-Butadiene | 5.0 kg |
| Diisopropylbenzene hydroperoxide | 20 g |
| Potassium beef-tallow fatty acid | 100 g |
| sodium N-lauroylsarcosine | 50 g |
| Sodium pyrophosphate | 50 g |
| Ferrous sulfate | 0.5 g |
| Dextrose | 30 g |
| Deionized water | 20 kg |

The results of the evaluation of the physical properties of the obtained cast plate are shown in Table 1.

EXAMPLE 6

A methacrylic resin cast plate was prepared in the same manner as described in Example 5 except that the partial polymerization product of methyl methacrylate was changed to a methyl methacrylate partial polymerization product having a viscosity of 100 centipoise (conversion = 10%) and comprising 97% by weight of methyl methacrylate units and 3% by weight of benzyl methacrylate units. The results of the measurement of the physical properties of the obtained cast plate are shown in Table 1.

COMPARATIVE EXAMPLE 2

A methacrylic resin cast plate was prepared in the same manner as described in Example 1 except that a rubber latex having a particle diameter of 0.07 μm was prepared at a conversion of 97% from a composition comprising the following components.

| Butyl acrylate | 1.0 kg |
|---|---|
| 1,3-Butadiene | 9.0 kg |
| Diisopropylbenzene dihydroperoxide | 20 g |
| Potassium beef-tallow fatty acid | 100 g |
| Sodium N-lauroylsarcosine | 50 g |
| Sodium pyrophosphate | 50 g |
| Ferrous sulfate | 0.5 g |
| Dextrose | 30 g |
| Deionized water | 20 kg |

The results of the evaluation of the physical properties of the obtained cast plate are shown in Table 1.

EXAMPLE 7

| n-Butyl acrylate | 5.5 kg |
|---|---|
| 1,3-Butadiene | 4.5 kg |
| Diisopropylbenzene hydroperoxide | 20 g |
| Potassium beef-tallow fatty acid (TK-1) | 120 g |
| Sodium N-lauroylsarcosine (Sarcosinate LN) | 80 g |
| Sodium pyrophosphate | 50 g |
| Ferrous sulfate | 0.5 g |
| Dextrose | 30 g |
| Deionized water | 20 kg |

Oxygen contained in the above components exclusive of 1,3-butadiene was replaced by nitrogen so that the polymerization reaction was not inhibited, then all the components were charged in a 40-liter autoclave, and the polymerization was carried out at 50° C. The polymerization was completed in 9 hours, and a rubber latex having a particle diameter of 0.07 μm was obtained at a conversion of 97%.

(2) Synthesis of Agglomerating Acid Group-Containing Copolymer Latex

| First Stage | |
|---|---|
| n-Butyl acrylate | 250 g |
| Potassium oleate | 20 g |
| Sodium dioctylsulfosuccinate | 10 g |
| Cumene hydroperoxide | 1.0 g |
| Sodium formaldehyde-sulfoxylate | 3 g |
| Deionized water | 2000 g |

The mixture of the above components was polymerized at 70° C. for 1.5 hours in a 5-liter roundbottom glass flask.

| Second Stage | |
|---|---|
| n-Butyl acrylate | 600 g |
| Methacrylic acid | 150 g |
| Cumene hydroperoxide | 3 g |

Thereafter, the mixture of the above-mentioned components was dropped into the above polymerization mixture over a period of 1 hour, and the reaction mixture was stirred for 1 hour to obtain a copolymer latex having a particle diameter of 0.09 μm at a conversion of 98%.

(3) Preparation of Agglomerated Rubbery Copolymer [II']

The above-mentioned rubbery copolymer latex containing 10 kg of the polymer solid was stirred in a 60-liter autoclave, 152 g of the latex of the acid group-containing copolymer was added, and the mixture was maintained for 30 minutes. Then, 1.5 kg of a 10% aqueous solution of sodium sulfate was added to the mixture at an inner temperature of 50° C. and the mixture was maintained at this temperature for 15 minutes. The average particle diameter of the obtained agglomerated rubbery copolymer was 0.188 μm.

(4) Preparation of Crosslinked Rubbery Copolymer [II]

A 100-liter autoclave was charged with the latex of the agglomerated rubbery copolymer [II'] containing 10 kg of the polymer solid, 5 kg of deionized water, 7 g of sodium formaldehyde-sulfoxylate and 10 g of Sarcocinate LN, and nitrogen gas was blown into the charge with stirring to produce an oxygen-free state. Then, the inner temperature was elevated to 80° C. and a monomer mixture comprising components shown below was continuously added to the charge over a period of 170 minutes. After completion of the addition, the polymerization was further conducted for 180 minutes to obtain a latex of a crosslinked rubbery copolymer [II] comprising the rubbery copolymer in the interiors of particles and the crosslinked acrylic acid ester copolymer constituting outer layers of the particles.

| | | |
|---|---|---|
| Butyl acrylate | 81% by weight | |
| Styrene | 17.2% by weight | |
| 1,4-Butanediol diacrylate | 0.3% by weight | 25 kg |
| Allyl cinnamate | 1.5% by weight | |
| Perbutyl H* | | 7.5 g |

*tertiary butyl hydroperoxide (supplied by Nippon Oil and Fats)

The conversion of butyl acrylate was 97% and the conversion of styrene was 99.5%. The particle diameter of the obtained latex was 0.21 μm.

(5) Preparation of Graft Copolymer [IV]

In the reaction vessel filled with the above-mentioned latex of the crosslinked rubbery copolymer [II] containing 12.5 kg of the polymer solid, 20 g of Sarcocinate LN and 1 kg of deionized water were incorporated, and a monomer mixture having a composition described below was continuously added over a period of 60 minutes.

| Composition of Monomer Mixture | |
|---|---|
| Methyl methacrylate (96%) | 4.8 kg |
| Ethyl acrylate (4%) | 0.2 kg |
| n-Octylmercaptan | 11 g |
| Perbutyl H | 7.5 g |

The conversion of methyl methacrylate was substantially 100%.

To 30 kg of the obtained polymer latex were added 58 g of styrenated phenol, 44 g of dilauryl thiodipropionate and 58 g of triphenyl phosphite, and the latex was coagulated at a temperature of 50° C. with 0.25% aqueous sulfuric acid at a latex/water ratio of ½ and was maintained at 85° C. for 5 minutes.

The obtained polymer slurry was washed, dehydrated and dried at 65° C. for 36 hours to obtain a white resin powder (graft copolymer [IV]).

(6) Preparation of Casting Material (Mixture [V])

To 100 parts of a partial polymerization product of methyl methacrylate having a viscosity of 100 centipoise (conversion = 10%) was added 10 parts of the graft copolymer [IV] (white powder), and the graft copolymer was uniformly dispersed by stirring for about 1 hour using a homomixer. Then, 0.2 part of 2-(5methyl-2-hydroxyphenyl)benzotriazole and 0.3 part of bis(2,2,6,6-tetramethyl-4-piperidyl) sebacate were added as the stabilizer, and 0.06 part of azobis(2,4-dimethylvaleronitrile) was dissolved as the polymerization initiator to obtain a starting casting material (mixture [V])

(7) Preparation of Cast Plate

Dissolved air was removed from the starting casting material (mixture [V]under a reduced pressure. The starting material was poured into a cell constructed of gaskets and two reinforced glass sheets, so that the thickness of the formed plate was 3 mm. The polymerization was carried out for 60 minutes in a warm water atmosphere maintained at 80° C. and for 30 minutes in an air atmosphere maintained at 130° C.

The results of the evaluation of the physical properties of the obtained methacrylic resin cast plate having a thickness of 3 mm are shown in Table 1.

EXAMPLE 8

A rubber latex was prepared in the same manner as described in Example 7 except that the composition of the starting material for the production of the rubber latex was changed as indicated below.

| | |
|---|---|
| n-Butyl acrylate | 5 kg |
| 1,3-Butadiene | 5 kg |
| Diisopropylbenzene hydroperoxide | 20 g |
| Potassium beef-tallow fatty acid (TK-1) | 120 g |
| Sodium N-lauroylsarcosine (Sarcosinate LN) | 80 g |
| Sodium pyrophosphate | 50 g |
| Ferrous sulfate | 0.5 g |
| Dextrose | 30 g |
| Deionized water | 20 kg |

Then, a methacrylic resin cast plate was prepared in the same manner as described in Example 1 except that the compositions and amounts of the starting materials for the graft polymerization at the first and second stages were changed as indicated below. The results of the measurement of the physical properties of the obtained cast plate are shown in Table 1.

| First Stage | | |
|---|---|---|
| Butyl acrylate | 80% by weight | |
| Styrene | 18.2% by weight | |
| 1,4-Butanediol diacrylate | 0.3% by weight | 10 kg |
| Allyl cinnamate | 1.5% by weight | |
| Perbutyl H | | 30 g |
| Second Stage | | |
| Methyl methacrylate (96%) | | 7.68 kg |
| Ethyl acrylate (4%) | | 0.32 kg |
| n-Octylmercaptan (n-OSH) | | 17.6 g |

| | |
|---|---|
| Perbutyl H | 12 g |

EXAMPLE 9

(1) Preparation of Rubbery Copolymer [II]

| | |
|---|---|
| Feed Material (a): | |
| Deionized water | 20 kg |
| Potassium persulfate | 30 g |
| Feed Material (b): | |
| n-Butyl acrylate | 8 kg |
| Styrene | 2 kg |
| Allyl methacrylate | 50 g |
| 1,3-Butylene dimethacrylate | 50 g |

Oxygen contained in the above-mentioned starting materials was replaced by nitrogen so that the polymerization reaction was not inhibited. A 4-liter autoclave was charged with the above feed material (a), the above feed material (b) was added dropwise at 80° C. over a period of 90 minutes, and stirring was continued for 180 minutes to obtain a copolymer latex at a conversion of 98%. The average particle diameter of the obtained rubbery copolymer [II] was 0.43 μm.

(2) The reaction vessel filled with the above-mentioned rubbery copolymer latex was charged with 11 kg of deionized water, 4 g of ferrous sulfate, 24 g of sodium formaldehyde-sulfoxylate and 17 g of disodium ethylenediaminetetra-acetate, the inner temperature was elevated to 80° C., and the following starting material was continuously dropped therein over a period of 60 minutes.

| | |
|---|---|
| Methyl methacrylate | 5,225 g |
| Methyl acrylate | 275 g |
| t-Butyl hydroperoxide | 16.5 g |
| n-Octylmercaptan | 2.75 g |

After completion of the dropwise addition, the polymerization was further conducted for 60 minutes. The conversion of methyl methacrylate was substantially 100%. The obtained graft copolymer [IV] latex was coagulated at 50° C. with 5% by weight, based on the resin, of magnesium sulfate at a latex/water ratio of ½ and was maintained at 85° C. for 5 minutes, washed, dehydrated and dried to obtain a white powder (graft copolymer [IV]). A methacrylic resin cast plate was prepared by using this graft copolymer [IV] according to the procedures described in (5) and (6) of Example 1. The results of the evaluation of the physical properties of the methacrylic resin cast plate are shown in Table 1.

COMPARATIVE EXAMPLE 3

A reaction vessel of a stainless steel having an inner volume of 50 l was charged with the following feed materials (a) and (b), and nitrogen was blown into the reaction vessel with stirring to produce an oxygen-free state. Then, the temperature was elevated to 65° C. and the following feed material (c) was added, the temperature was elevated to 80° C., and the polymerization was conducted for 90 minutes. Then, 5 kg of the feed material (b) was continuously added again over a period of 90 minutes, and the polymerization was conducted for 120 minutes to obtain an acrylic latex.

| | |
|---|---|
| Feed Material (a): | |
| Deionized water | 30 kg |
| Sodium N-lauroylsarcosine | 100 g |
| Boric acid | 100 g |
| Sodium carbonate | 10 g |
| Feed Material (b): | |
| Styrene | 950 g |
| n-Butyl acrylate | 4,000 g |
| Allyl methacrylate | 50 g |
| Cumene hydroperoxide | 15 g |
| Feed Material (c): | |
| Deionized water | 500 g |
| Sodium formaldehyde-sulfoxylate | 50 g |

At this polymerization, the conversion of n-butyl acrylate was 98%, and from the results of the measurement by the absorbance method, it was found that the particle diameter of the obtained latex was 0.08 μm.

The above-mentioned reaction vessel containing the above-mentioned latex containing 10 kg (100 parts) of the polymer solid was charged with 500 g of deionized water and 25 g of sodium N-lauroylsarcosine as the feed material (d), and the mixture was stirred. While the mixture was maintained at 80° C., 80 parts of the following feed material (e) was continuously added to the mixture at a rate of 40 parts per hour. Then, the polymerization was conducted for 1 hour to obtain a graft copolymer in the form of a latex. The conversion of the monomers of the feed material (e) was at least 99.5%.

| | |
|---|---|
| Feed Material (e): | |
| Methyl methacrylate | 7,680 g |
| Ethyl acrylate | 320 g |
| n-Octylmercaptan | 28 g |
| Cumene hydroperoxide | 24 g |

The latex was coagulated, washed and dried in the following manner, to obtain a powder of a rubber component having a multi-layer structure.

A stainless steel vessel was charged with 50 kg of 1.0% aqueous sulfuric acid, the temperature was elevated to 85° C. with stirring, and 25 kg of the obtained latex was continuously added over a period of 15 minutes. Then, the inner temperature was elevated to 90° C. and this temperature was maintained for 5 minutes, the mixture was cooled to room temperature, and the polymer was recovered by filtration and washed with deionized water to obtain a white creamy polymer. The creamy polymer was dried at 76° C. for 36 hours to obtain a graft polymer in the form of a white powder.

A methacrylic resin cast plate was prepared by using the obtained graft copolymer according to the procedures described in (5) and (6) of Example 1. The results of the evaluation of the physical properties of the obtained cast plate are shown in Table 1.

EXAMPLE 10

(1) Preparation of Rubbery Copolymer

| | |
|---|---|
| Feed Material (a): | |
| n-Butyl acrylate | 8 kg |
| Styrene | 2 kg |
| Allyl methacrylate | 80 g |
| Feed Material (b): | |
| Pelex OTP* | 70 g |
| Sodium carbonate | 5 g |
| Potassium persulfate | 80 g |

| Deionized water | 20 kg |
|---|---|

*sodium dialkylsulfosuccinate (supplied by Kao-Atlas)

A 40-liter polymerization vessel was charged with the feed material (b), the temperature was elevated to 70° C., and the feed material (a) was added dropwise over a period of 2 hours to effect the polymerization. The mixture was maintained at the above temperature for 1 hour to complete the polymerization, whereby a rubber latex having a particle diameter of 0.08 μm was obtained.

(2) Preparation of Agglomerated Rubbery Copolymer

Into a 100-liter vessel charged with the rubbery copolymer latex were added 1.5 kg of a 10% aqueous solution of sodium sulfate and 0.1 kg of a 10% aqueous solution of sodium hydroxide with stirring at an inner temperature of 50° C., and the mixture was maintained at this temperature for 15 minutes. Then, 152 g of the same agglomerating acid group-containing latex as synthesized in Example 7 was added to the mixture, and the mixture was maintained for 30 minutes. The average particle diameter of the obtained coarsened rubber copolymer [II] was 0.19 μm.

(3) Preparation of Graft Copolymer [IV]

To the obtained latex of the agglomerated rubbery copolymer [II] were added 20 g of sodium formaldehyde-sulfoxylate, 50 g of Pelex OTP, 30 mg of ferrous sulfate and 90 mg of sodium ethylenediaminetetra-acetate, dissolved in 9 kg of deionized water, and the inner temperature was elevated to 75° C. Then, the following feed material was continuously added to the mixture over a period of 90 minutes to effect the polymerization.

| Methyl methacrylate | 4,410 g |
|---|---|
| Methyl acrylate | 90 g |
| n-Octylmercaptan | 4.5 g |
| Cumene hydroperoxide | 13.5 g |

After completion of the addition, the polymerization was further conducted for 60 minutes. The conversion of methyl methacrylate was almost 100%. Then, 500 g of magnesium sulfate was dissolved in water in an amount 2 times the amount of the latex, the temperature was elevated to 50° C., and the latex was incorporated into the solution. Then, the temperature was elevated to 95° C. and the mixture was maintained at this temperature for 5 minutes. The obtained polymer slurry was washed, dehydrated and dried at 70° C. for 24 hours to obtain a white powder.

Then, the starting casting material and cast plate were prepared in the same manner as described in Example 1. The results of the evaluation of the physical properties of the obtained cast plate are shown in Table 1.

TABLE 1

Physical Properties of Cast Plate

| | Izod Impact Strength (kg · cm/cm$^2$) | Dynstat Impact Strength (kg · cm/cm$^2$) | Total Luminous Transmittance (%) | Haze value (%) |
|---|---|---|---|---|
| Example 1 | 5.0 | 18.5 | 92.5 | 1.4 |
| Example 2 | 6.4 | 23.4 | 92.5 | 3.5 |
| Example 3 | 3.4 | 12.0 | 92.5 | 0.6 |
| Example 4 | 7.3 | 26.0 | 92.5 | 6.6 |
| Example 5 | 5.3 | 20.5 | 92.5 | 4.4 |
| Example 6 | 5.3 | 20.0 | 92.3 | 1.9 |
| Example 7 | 4.0 | 14.4 | 92.5 | 1.5 |
| Example 8 | 3.5 | 12.0 | 92.5 | 3.5 |
| Example 9 | 3.7 | 13.2 | 92.0 | 2.5 |
| Example 10 | 3.0 | 11.0 | 92.2 | 2.5 |
| Comparative Example 1 | 1.5 | 5.0 | 93.0 | 0.3 |
| Comparative Example 2 | 5.6 | 20.1 | 71.0 | 77.5 |
| Comparative Example 3 | 1.7 | 6.5 | 92.5 | 2.0 |

EXAMPLE 11

The cast plates prepared in Examples 1, 8 and 9 and Comparative Examples 1 and 2 were subjected to an accelerated exposure test for 300 hours at a temperature of 63° C. with rainfall (48 minutes-dry/12 minutes-rainfall) by using an accelerated exposure tester (Sunshine Weater-O-Meter supplied by Suga Shikenki), and the physical properties of the cast plates were measured. The results are shown in Table 2.

TABLE 2

| | After 300 Hours' Accelerated Exposure | | Before Accelerated Exposure | |
|---|---|---|---|---|
| | Dynstat Impact Strength (kg · cm/cm$^2$) | Haze (%) | Dynstat Impact Strength (kg · cm/cm$^2$) | Haze value (%) |
| Example 1 | 13.9 | 2.7 | 18.5 | 1.4 |
| Example 8 | 10.1 | 4.0 | 12.0 | 3.5 |
| Example 9 | 12.2 | 2.6 | 13.2 | 2.5 |
| Comparative Example 1 | 5.0 | 0.3 | 5.0 | 0.3 |
| Comparative Example 2 | 7.5 | Above 80 | 20.1 | 77.5 |

We claim:

1. A methacrylic resin cast plate having a high transparency and an excellent impact resistance, said plate being produced by a process comprising the steps of:
   (i) preparing a mixture (V) by dispersing 5 to 20 parts of a graft copolymer (IV) into 100 parts by weight of a monomer component (I) selected from the group consisting of methyl methacrylate, a monomer mixture comprising at least 90% by weight of methyl methacrylate and up to 10% by weight of at least one monomer copolymerizable therewith, a partial polymerization product thereof, and a mixture thereof; and
   wherein the graft copolymer (IV) is obtained by graft-polymerizing a monomer of a hard resin component (III) containing at least 90% by weight of methyl methacrylate onto a rubbery copolymer (II) having an average particle diameter of 0.1 to 1 μm and a crosslinking structure, wherein said rubbery copolymer comprises at least 45% by weight n-butyl acrylate; and
   (ii) polymerizing the mixture (V) in a casting mold.

2. A methacrylate resin cast plate according to claim 1, wherein the crosslinked rubbery copolymer (II) comprises 40 to 55% by weight of butadiene units and 60 to 45% by weight of n-butyl acrylate units.

3. A methacrylic resin cast plate according to claim 1, wherein the crosslinked rubbery copolymer (II) is obtained by polymerizing 69.9 to 89.9% by weight of n-butyl acrylate, 10 to 30% by weight of styrene or a mixture of styrene and a derivative thereof and 0.1 to 10% by weight of a polyfunctional monomer copolymerizable with said monomers.

4. A methacrylic resin cast plate according to claim 1, wherein 0.1 to 1.0% by weight of a benzotriazole ultraviolet absorber and 0.5 to 1.0% by weight of a hindered amine compound are further dispersed in the monomer component (I).

* * * * *